No. 643,030. Patented Feb. 6, 1900.
J. A. ANIELLO.
CANE PLANTING MACHINE.
(Application filed May 29, 1899.)
(No Model.) 3 Sheets—Sheet 1.
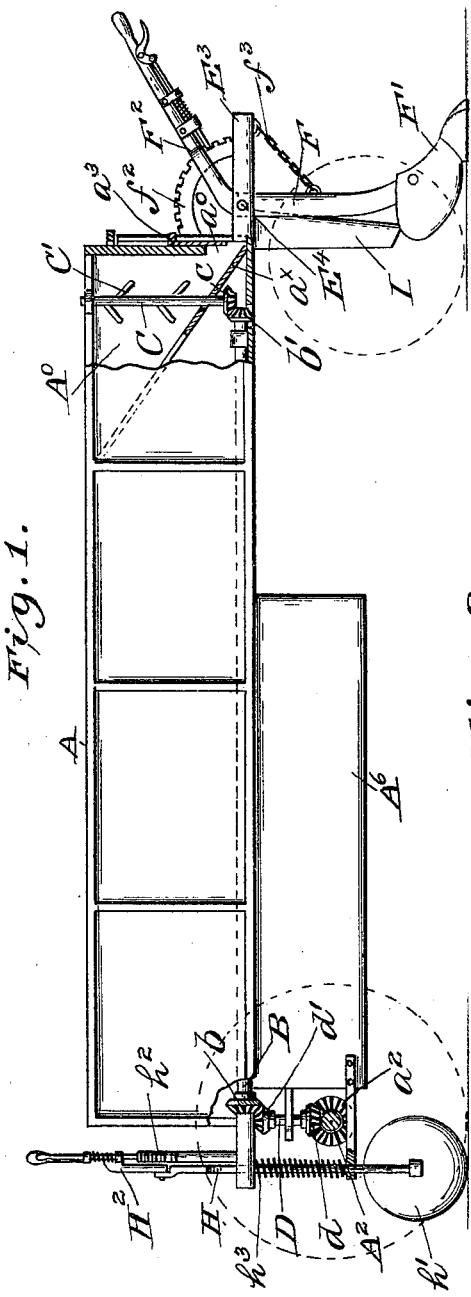
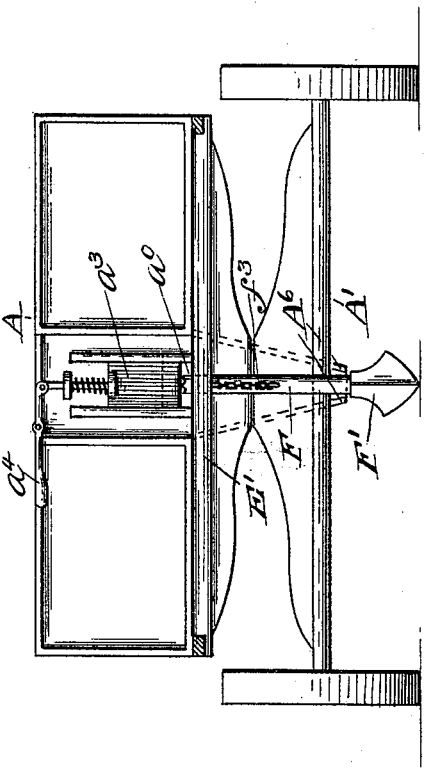
Witnesses
Jas H Blackwood
John Chalmers Wilson
Inventor
John A. Aniello,
by Wilkinson & Fisher
Attorneys No. 643,030. Patented Feb. 6, 1900.
J. A. ANIELLO.
CANE PLANTING MACHINE.
(Application filed May 29, 1899.)

(No Model.) 3 Sheets—Sheet 2.

Witnesses
Jas. F. Blackwood
John Chalmers Wilson

Inventor
John A. Aniello
By Wilkinson & Fisher
Attorneys

THE NORRIS PETERS CO., PHOTO-LITHO., WASHINGTON, D. C.

No. 643,030. Patented Feb. 6, 1900.
J. A. ANIELLO.
CANE PLANTING MACHINE.
(Application filed May 29, 1899.)
(No Model.) 3 Sheets—Sheet 3.

UNITED STATES PATENT OFFICE.

JOHN ANTONE ANIELLO, OF NEW ORLEANS, LOUISIANA, ASSIGNOR OF ONE-HALF TO JOHN A. MUIR AND JOSEPH FROMHERZ, OF SAME PLACE.

CANE-PLANTING MACHINE.

SPECIFICATION forming part of Letters Patent No. 643,030, dated February 6, 1900.

Application filed May 29, 1899. Serial No. 718,726. (No model.)

*To all whom it may concern:*

Be it known that I, JOHN ANTONE ANIELLO, a citizen of the United States, residing at New Orleans, in the parish of Orleans and State of Louisiana, have invented certain new and useful Improvements in Cane-Planting Machines; and I do hereby declare the following to be a full, clear, and exact description of the invention, such as will enable others skilled in the art to which it appertains to make and use the same.

My invention relates to improvements in devices for planting sugar-cane, and has for its object the provision of a cheap, simple, and convenient means for this purpose.

My invention consists in certain devices to be combined with a farm-wagon, which is also subjected to such alterations as will adapt it to receive such attachments of such construction and arrangement as will provide for opening the furrow, depositing fertilizer in the furrow, dropping in the cane, and covering the cane, all as a single operation, while the wagon fitted with these attachments is drawn along across the field to be planted.

My invention will be understood by reference to the accompanying drawings, wherein the same parts are indicated by the same letters throughout the several views.

Figure 3:
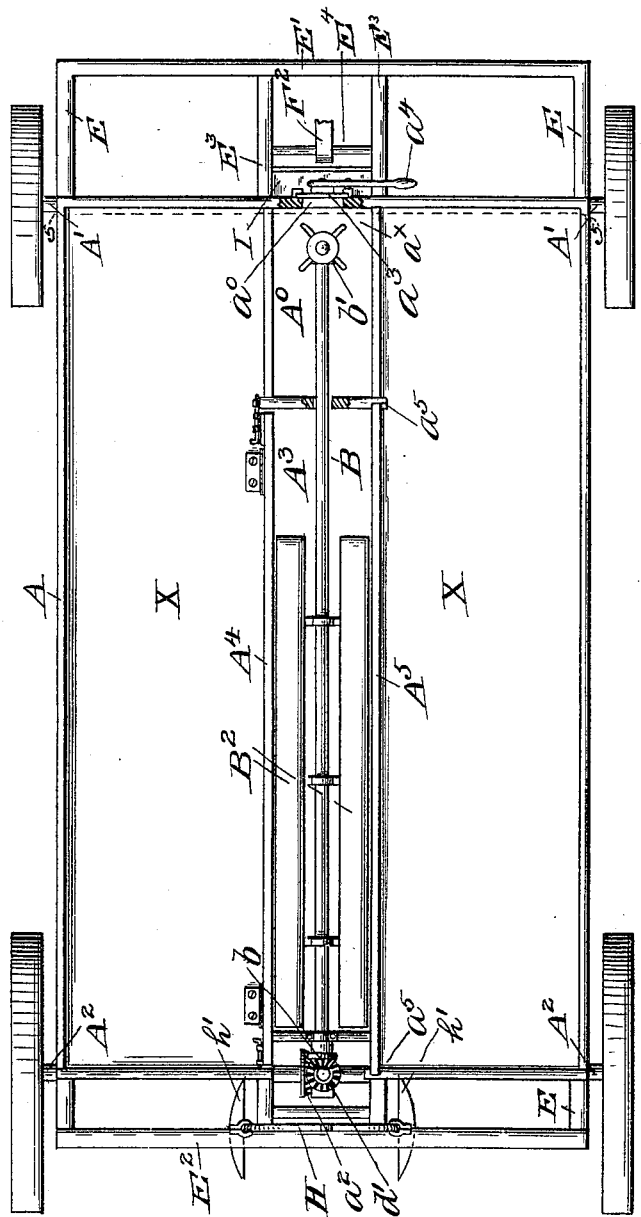
Figure 6:
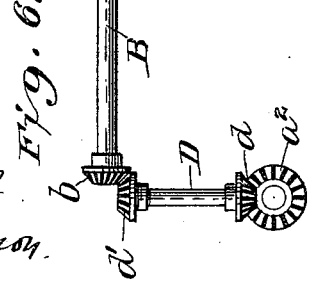
Figure 4:
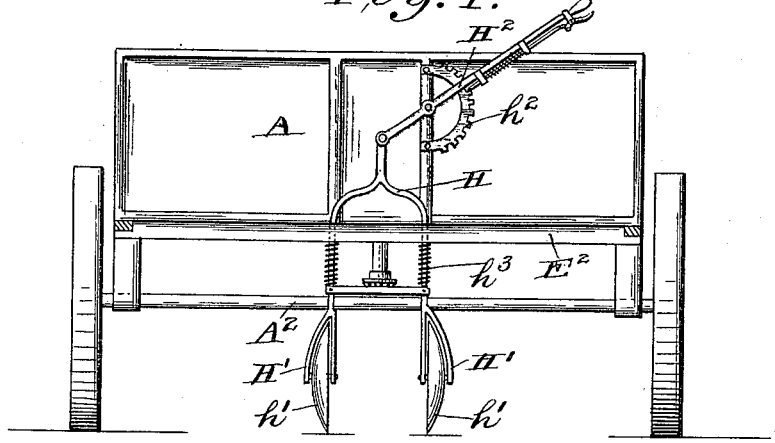
Figure 5:
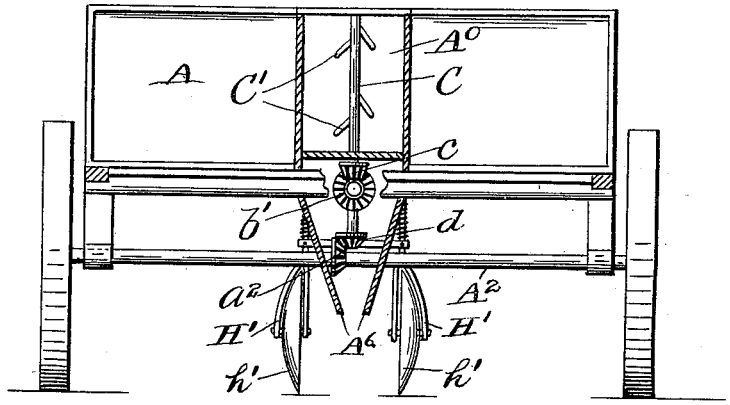

Figure 1 represents a side view of my invention, partly in section. Fig. 2 represents a front elevation of the same. Fig. 3 represents a top plan view. Fig. 4 represents a rear elevation. Fig. 5 is a section on the line 5 5 in Fig. 3; and Fig. 6 is a detail view, enlarged, showing the gearing for driving the fertilizer-stirrer.

A represents the body of the wagon, which is mounted upon front and rear axles $A'$ and $A^2$, respectively, fitted with wheels, as shown. The front axle $A'$ does not rotate; but the rear axle $A^2$ should be arranged to rotate with the rear wheels, and upon this rear axle is mounted a gear-wheel $a^2$ of any suitable desired form. The body A has a fertilizer-box $A^0$ formed therein at its forward end, having an inclined bottom $a^\times$ and a discharge-opening $a^0$, fitted with a vertically-movable gate $a^3$, operated by a pivoted lever $a^4$, connected thereto. In rear of the fertilizer-box and centrally of the wagon-body a longitudinal opening $A^3$ is formed. At one side of this opening is hinged a plank $A^4$, which is so arranged as to close this opening $A^3$ when lowered flat or when raised upon edge, as seen in Figs. 3 and 5, to serve as a side wall for the said opening. A similar plank $A^5$, which fits at its ends in vertical groove $a^5$, is provided to serve as the opposite side wall for the opening $A^3$ and being removable may be taken out and put away when the opening is closed, as when the wagon is used as such for ordinary hauling purposes.

B represents a shaft which is journaled longitudinally of the wagon-body centrally beneath the opening $A^3$ and is provided at its rear end with a beveled gear $b$ and at its forward end with a similar beveled gear $b'$, the forward end of the said shaft extending beneath the fertilizer-box and the pinion $b'$ thereon meshing with a beveled pinion $c$ upon a shaft C, provided with a number of stirring-fingers $C'$, which as the said shaft C is rotated by means of the shaft B agitate the mass of fertilizer contained within the said box $A^0$ and insure a uniform feed therefrom. A short vertical shaft D, fitted with a beveled pinion $d$, which meshes with gear $a^2$ upon the rear axle $A^2$, also is provided with a beveled pinion $d'$, which meshes with gear $b$ upon the rear end of the shaft B. Through the said vertical shaft, which is rotated from the rear axle by means of intermeshing gears $a^2$ and $d$ and through intermeshing gears $d'$ and $b$, the shaft B is driven. The said shaft has mounted thereon a plurality of blades $B^2$, which turn therewith, as seen most clearly in Fig. 3. These blades are just wide enough to rotate freely within the opening $A^3$ of the wagon-body.

The body is provided with lower side beams E, which extend forward and to the rear of the body, more or less, and are connected at the ends by cross-beams $E'$ and $E^2$ at front and rear, respectively. Short beams $E^3$ are mounted between the front beam $E'$ and the front of the wagon-body, and beneath these beams and upon a shaft $E^4$, journaled therein, is mounted a plow-standard F, carrying a plow-point $F'$ at its lower end. At the upper end of the said standard F is a rigid lever $F^2$, by means of which the plow-standard F may be tilted as desired, and this lever F² is provided with a catch engaging the toothed quadrant f² for retaining the plow-standard at any desired adjustment. A chain f³, attached to the plow-standard F at one end and at the other end attached to the front cross-beam E', serves to limit the backward movement of the plow-standard.

Upon the rear cross-beam E² is mounted a forked frame H, having bifurcated feet H', within which are rotatably mounted a pair of disk plows h', arranged to straddle the furrow made by the plow F'. To this forked frame H is connected a pivoted hand-lever H², which is provided with a catch for engaging the toothed quadrant h², by means of which the said frame may be retained at any desired elevation. Coil-springs h³, surrounding the legs of this forked frame and confined beneath the rear cross-beam E², serve to cause a depression of the disk plows h', which, however, may be raised or lowered at will by means of the pivoted hand-lever H².

Beneath the longitudinal opening A³ of the wagon-body are mounted a pair of inclined planks A⁶, which constitute a chute for directing the stalks into the furrow. Beneath the opening a⁰ in the forward end of the wagon-body is mounted a flexible tube I, which may be of heavy canvas or similar material, for directing the flow of fertilizer from the box A⁰ to the furrow behind the plow F', insuring its delivery thereto and avoiding the danger of being scattered by the wind or by the jolting of the wagon.

The wagon may be provided with any suitable sort of a tongue for the attachment of a pair of animals to the forward axle; but this being no part of my invention I have omitted any showing thereof from the drawings.

The operation of the device when in use for planting cane is as follows: The spaces X X in the wagon-body, upon the sides of the central opening therein, are filled with the cane to be planted. The fertilizer-box is previously filled with fertilizer, the plow F' is lowered and adjusted for opening a furrow, and the disk plows h' at the rear of the wagon are also lowered into their operative positions and the team is started. As the wagon is drawn along the plow F' opens up a furrow, into which the fertilizer is discharged from the box A⁰ under the agitation of the stirrer C therein, which is rotated through the shaft B from the rear axle of the wagon, and the stalks are dropped into the opening A³, falling upon the blades B² upon the shaft B and dropping through the said opening under the guidance of the planks A⁶, forming a delivery-chute therefor into the furrow. The disk plows following along in their turn throw the earth from the sides of the furrow over inwardly upon the stalks, completing the operation of planting.

When the planting season is over and it is desired to use the wagon for ordinary hauling purposes, the plows may be detached therefrom and the shafting and driving-gear also detached, and the plank A⁵ can be removed and laid away, the hinged plank A⁴ being lowered to close the opening A³ in the bottom of the wagon-body.

Having thus described my invention, what I claim as new, and desire to secure by Letters Patent of the United States, is—

1. In a machine for planting cane, the combination with a wheeled vehicle having a longitudinal opening for the passage of stalks in a horizontal position; compartments for carrying cane, and a compartment for carrying fertilizer; and guides beneath said opening for keeping the stalks parallel to the line of movement of the vehicle; of a rotary shaft journaled longitudinally of said opening, and carrying blades arranged to turn in said opening; a stirrer in the fertilizer-compartment; intermeshing gears on the said shaft and stirrer, and gearing for rotating said shaft from one set of wheels of the vehicle, substantially as described.

2. In a machine for planting cane, the combination with a wheeled vehicle, having a longitudinal opening for the passage of stalks in a horizontal position; compartments upon the sides of said opening for containing cane to be planted; a compartment in front of said opening for fertilizer; of a rotary shaft journaled longitudinally of said opening; blades rigidly mounted upon said shaft, a stirrer in the fertilizer-compartment geared to said shaft; a plow carried by the vehicle in advance of said longitudinal opening for making a furrow; plows carried by said vehicle in rear of said opening for closing the furrow; and gearing between said shaft and an axle of the vehicle for rotating said shaft, substantially as described.

3. In a machine for planting cane, the combination with a wheeled vehicle having a longitudinal opening for the passage of stalks in a horizontal position; compartments for carrying cane and a compartment for carrying fertilizer; and guides beneath said opening for keeping the stalks parallel to the line of movement of the vehicle; of a rotary shaft journaled longitudinally of said opening, and carrying blades arranged to turn in said opening; a stirrer in the fertilizer-compartment; intermeshing gears on the said shaft and stirrer, a plow carried by the vehicle in advance of said longitudinal opening for making a furrow; plows carried by said vehicle in rear of said opening for closing the furrow; and gearing for rotating said shaft from one set of wheels of the vehicle, substantially as described.

In testimony whereof I affix my signature in presence of two witnesses.

JOHN ANTONE ANIELLO.

Witnesses:
P. A. CHOPIN,
JOHN J. SAUCIER.